Jan. 25, 1944.  J. R. REYBURN  2,339,879
WHEEL LOCK
Filed Jan. 10, 1942
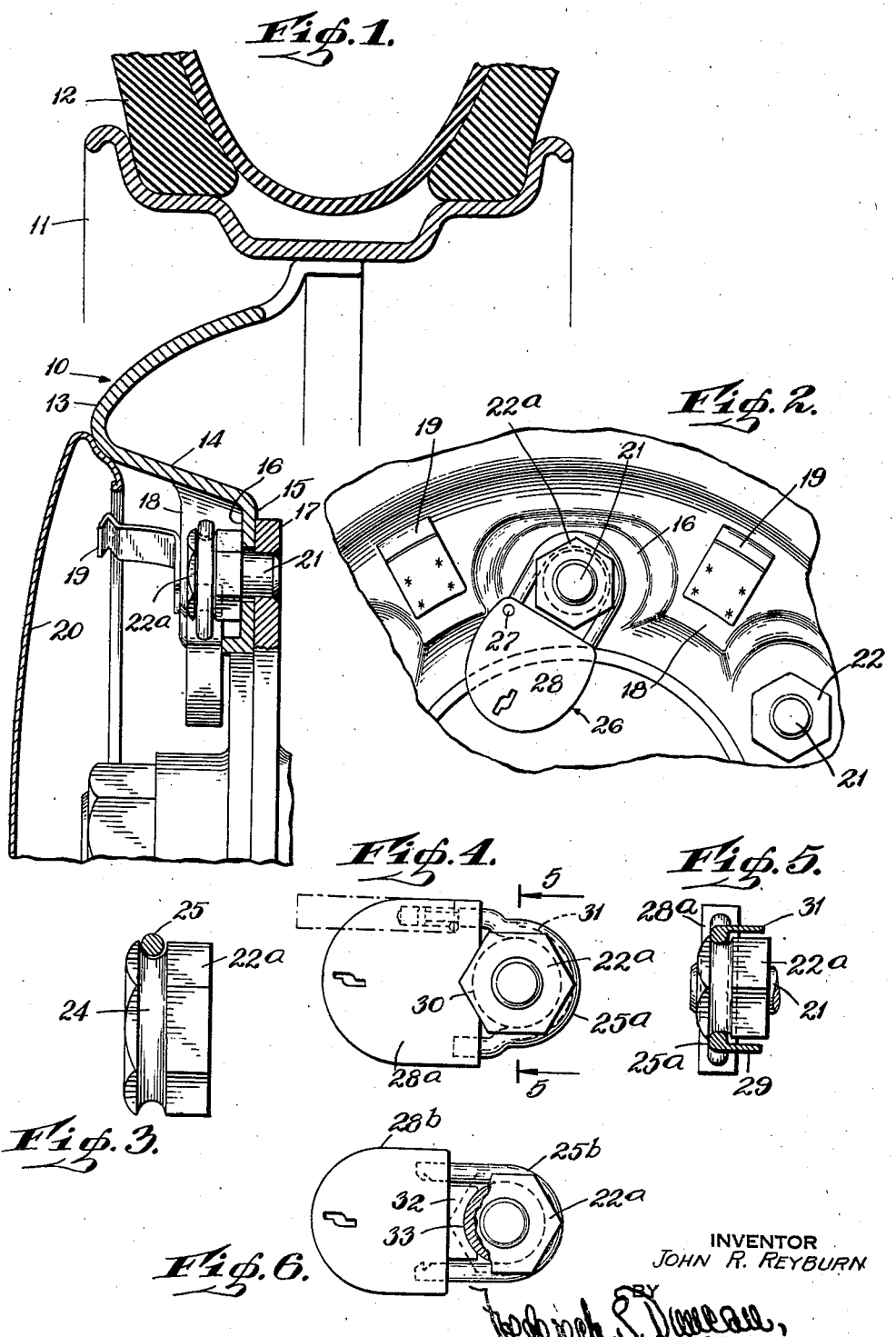
INVENTOR
JOHN R. REYBURN
BY
ATTORNEY Patented Jan. 25, 1944

2,339,879

UNITED STATES PATENT OFFICE 2,339,879

WHEEL LOCK

John R. Reyburn, Fairfield, Conn., assignor to American Chain & Cable Company, Inc., New York, N. Y., a corporation of New York Application January 10, 1942, Serial No. 426,276

3 Claims. (Cl. 70—259)

This invention relates to a theft preventer and more particularly to a device for preventing theft of wheels and tires.

One of the principal objects of this invention is to provide means for preventing unauthorized dismounting of the disc wheels from their hubs and for the accomplishment of this object means is provided for preventing the removal of one of the several securing devices, such as nuts or threaded bolts, which secure a disc wheel in position on its hub.

A more specific object of this invention is to provide means which prevents the application of a wrench to one of the securing devices.

More specific objects of this invention are the use of a padlock to prevent the application of a wrench to the securing means, to provide such padlock with means preventing the use of the padlock itself as a purchase or wrench for removing the securing means, to provide a bow of the padlock with a flange overhanging the wrench faces of said securing means, and to provide the body of the padlock with means interlocking with the securing means when used with disc wheels provided with means which prevent or limit rotation of the padlock.

Other objects of the invention will appear from the following description taken in connection with the drawing in which—

Fig. 1 is a radial section through the upper half of a wheel showing my invention;

Fig. 2 is a face view of the inner portion of the section of the wheel shown in Fig. 1;

Fig. 3 is a side view of my improved securing nut;

Fig. 4 is a side view of an improved padlock;

Fig. 5 is a section on the line 5—5 of Fig. 4; and

Fig. 6 shows another form of improved padlock.

In Fig. 1 I have disclosed a well known form of demountable disc wheel indicated generally at 10, on the periphery of which is mounted and secured as by welding a rim 11 on which a tire 12 is mounted. The disc wheel may be of any shape but as disclosed is provided with an outwardly dished portion 13, a reentrant portion 14, and an annular hub section 15 provided with depressed portions 16 formed to seat against the outer face of the hub 17, and with raised bracing portions 18. Attached to the raised portions 18 are spring fingers 19 for engaging and holding a hub cap 20 in position on the disc wheel. The depressed portions 16 are perforated to receive threaded studs 21 secured in the hub 17 and are of sufficient size to receive the securing nuts 22 and permit of a wrench to be applied to the nuts. In some makes of automobiles the securing means comprises threaded stud bolts entering threaded recesses in the hub. The invention is applicable to either a nut or threaded stud bolt securing means but has herein been shown in connection with the nut securing means. Each wheel may be equipped with six of these securing devices but it is necessary only that one of these securing devices be replaced by my invention.

In carrying out my invention I provide a nut 22a which for convenience is of the same size and shape as the nuts 22 used on the wheels on which my invention is to be applied. This nut may be of the same length as the nuts 22 but its length may be changed to facilitate the use of a padlock. The nut 22a is provided with a circumferential groove 24 to receive a bow 25 of a padlock 26 and as disclosed in Fig. 2, the bow may be hinged as indicated at 27 to the body 28 of the padlock. The groove should be so located with respect to the outer end of the nut and the transverse dimension or thickness of the material of the bow should be so chosen that the bow will prevent the application of a wrench to the outer or inner ends of the nut as will be apparent from an inspection of the several figures. It is preferred to make the bottom of the groove circular, that is, concentric with the axis of the nut and to use a padlock having a bow provided with a circular loop to facilitate application of the bow to the nut. The length of the bow in Fig. 2 in relation to the diameter of the nut is such that only slight relative rotational movement of the padlock and nut is permitted so that the padlock acts as a lock for the nut when its rotational movement is arrested by a raised bracing portion 18 on the wheel disc. If it is desired to permit unlimited relative rotational movement between the padlock and nut a padlock with a longer bow may be used. The groove should be of such depth as to prevent a cutter from being used to sever the bow.

In the use of my invention one of the securing nuts on each disc wheel is replaced by a nut of my invention. After the nut has been tightened the legs of the bow of the padlock will be passed through the groove of the nut and then the bow will be closed and the padlock locked in position on the nut.

For the purpose of preventing the insertion of a tool or screw driver in the space between the body of the padlock and the nut with the intention of using the padlock as a wrench, the bow end of the body 28a of the padlock in Fig. 4 may be provided with a recess 30 conforming to and engaging adjacent wrench faces of the nut 22a. As disclosed in Fig. 4 the bow 25a may be swingly mounted in the body 28a and the bow may be provided with a skirt 31, see also Fig. 5, to prevent application of a wrench or other tool to the inner end of the nut.

In Fig. 6 I have disclosed a padlock provided with a bow 25b which may be slidingly removed from or inserted in the body 28b and in order to prevent the insertion of a tool between the nut and the body of the padlock I provide the body of the padlock with a projection 32 provided with a forward concave edge 33 of the same radius of curvature as the bottom of the groove in the nut. The projection 32 if desired may be a separate member. The width of the projection is preferably substantially the same as the distance between the legs of the bow.

The construction disclosed in Fig. 6 in which the padlock is mounted for relative rotation with respect to the nut may be used with disc wheels having raised bracing portions 18 or the reentrant portion 14 which prevent a complete rotation of the padlock or with disc wheels having plain outer faces. When the padlock disclosed in Figs. 1 to 5 is used with disc wheels of the construction disclosed the padlock serves as a lock for the nut.

To permit and to greatly facilitate the assembly of the padlock shown in Figs. 1 to 3 with the improved nut of my invention, the groove in the nut 22a is preferably made of smaller diameter than the interior diameter of the loop of the bow of the padlock and of greater width than the thickness of the material of the bow. This permits the padlock to be tilted and also permits the body of the lock to clear the nut as the bow is slid on or off from the nut. In Figs. 4 and 5 the ends of the legs of the bow 25a are offset laterally to provide for clearance between the body of the lock and the nut when the body is rotated into the position shown by dot and dash lines. As indicated the groove in the nut may be of a diameter just slightly smaller than that of the interior diameter of the loop of the bow but the width of the groove is preferably the same as that of the groove shown in Figs. 1, 2 and 3. In Fig. 6 the closed end of the bow 25b is removable from the body of the lock and therefore the diameter of the groove in the nut may be of the same as the interior diameter of the loop of the bow and may be of the same width as the thickness of the material of the bow. If found desirable for convenience in assembly the groove in the nut and the bow of the lock may be relatively dimensioned the same as are the groove in the nut and the bow disclosed in Figs. 1 to 5.

While I have described several modifications of my invention, it is to be understood that other modifications may become obvious to those understanding my invention and that I reserve the right to all such changes as fall within the principles of my invention and the scope of the appended claims.

I claim:

1. The combination of a threaded securing element provided exteriorly with angularly related wrench engageable faces and with a circumferentially extending groove in said faces, and a padlock comprising a body portion and a bow, said bow being seated in said groove when the padlock is applied about said element, and said body portion being provided on the face of its bow-end with angularly related faces adapted to interlockingly engage the wrench engageable faces on said securing element.

2. The combination of a threaded securing element provided exteriorly with angularly related wrench engageable faces and with a circumferentially extending groove in said faces, and a padlock comprising a body portion and a bow, said bow being seated in said groove when the padlock is applied about said element, and said body portion having the face of its bow-end cooperating with said wrench engageable faces on said securing element to prevent relative rotation of said padlock and securing element.

3. The combination with a hub, a disc wheel having a perforated hub section positioned against one face of said hub, securing means involving threaded elements and a wrench engaging part adapted to be tightened against the outer face of said disc wheel and provided with a flat wrench engaging face, said disc wheel provided with laterally extending portions in the planes of said wrench engaging parts, one of said wrench engaging parts being provided with a circumferentially extending groove, a padlock applied to said last mentioned part with its bow engaging in said groove and of such dimension that the distance between the axis of said last mentioned part and the lower end of the body of the padlock is greater than the distance between the axis of said last mentioned part and an adjacent laterally extending portion on said disc wheel, the bow end of the body of said padlock and said flat face cooperating to limit relative rotation of said padlock and wrench engaging part.

JOHN R. REYBURN.